March 14, 1933. R. SIMPSON 1,901,197
ELECTRICAL MEASURING INSTRUMENT
Filed June 17, 1930 3 Sheets-Sheet 1
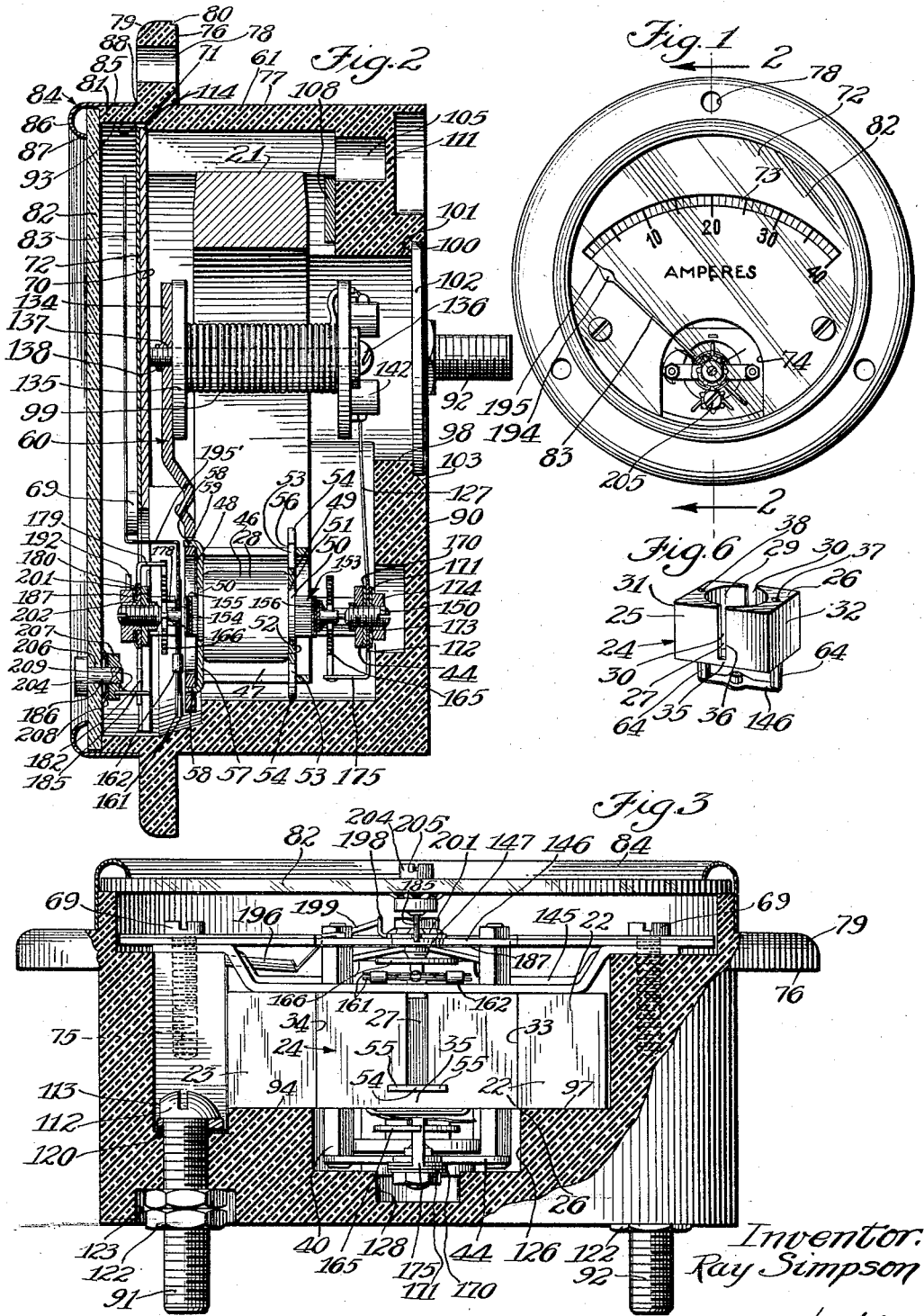
Inventor:
Ray Simpson
By Williams, Bradbury, McCalib & Hinkle
attys.

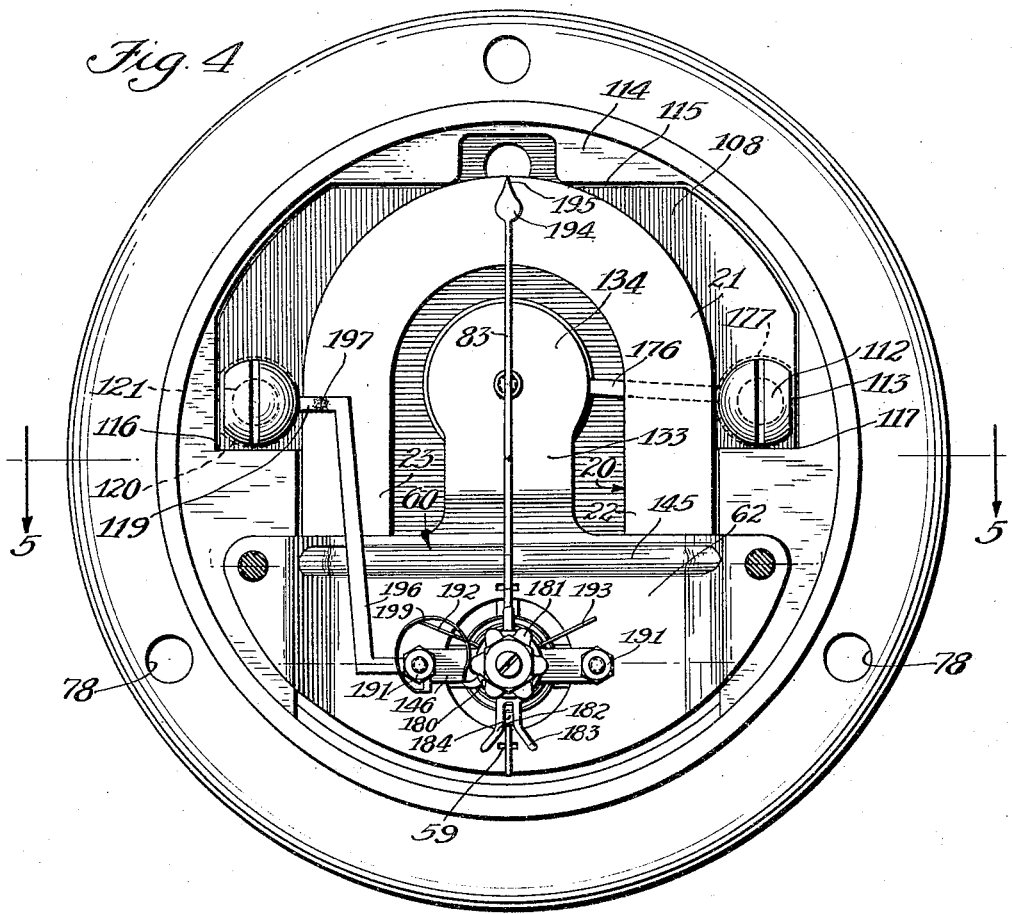

March 14, 1933.  R. SIMPSON  1,901,197
ELECTRICAL MEASURING INSTRUMENT
Filed June 17, 1930  3 Sheets-Sheet 3
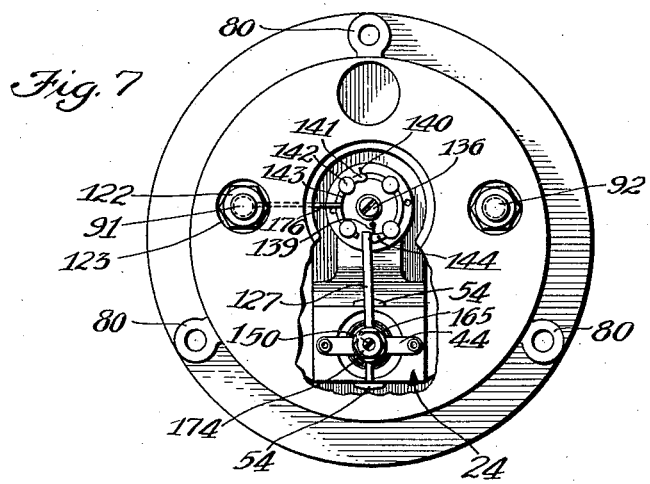
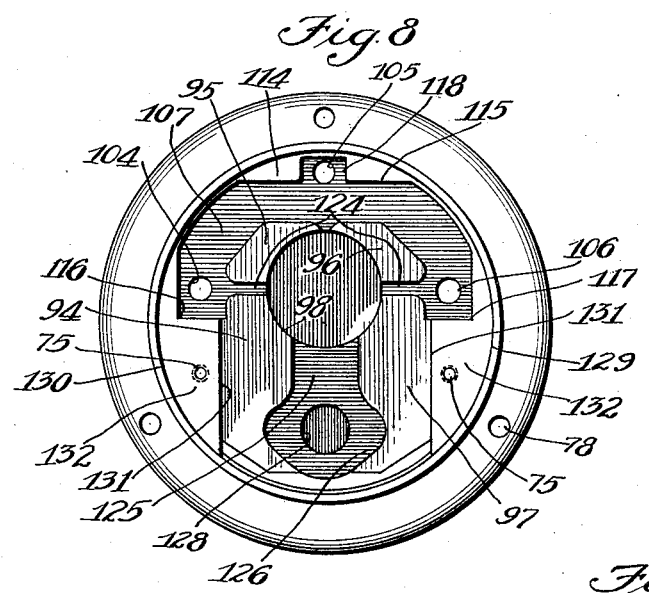
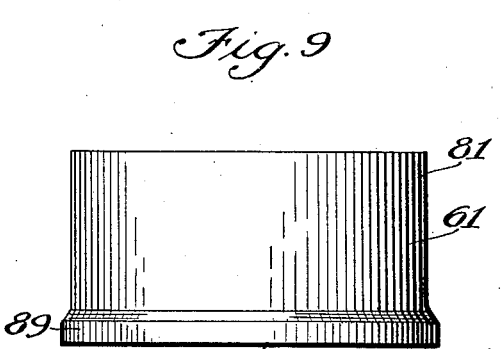
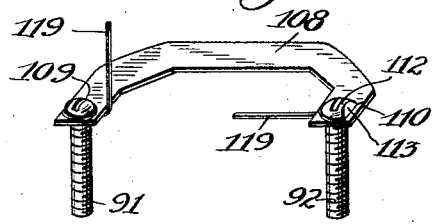
Inventor:
Ray Simpson
By Williams, Bradbury, McCaleb & Hinkle
attys.

Patented Mar. 14, 1933

1,901,197

UNITED STATES PATENT OFFICE

RAY SIMPSON, OF RIVER FOREST, ILLINOIS, ASSIGNOR, BY MESNE ASSIGNMENTS, TO JEWELL ELECTRICAL INSTRUMENT COMPANY, A CORPORATION OF NEW JERSEY

ELECTRICAL MEASURING INSTRUMENT

Application filed June 17, 1930. Serial No. 461,766.

The present invention relates to electrical measuring instruments, and is particularly concerned with instruments of the moving coil type.

One of the objects of the invention is the provision of an improved electrical measuring instrument, which is capable of being constructed more economically than the devices of the prior art, which accomplishes a high degree of accuracy of measurement and which is capable of highly satisfactory service in every respect.

Another object is the provision of an improved field structure which requires a minimum of machine work in its manufacture, and consequently also requires less heat treatment, since the magnet need not be softened or annealed for drilling operations and the like.

Another object is the provision of an improved casing and mode of support for the mechanism of an instrument of the class described, by means of which the necessity for further machine operations relating to the securement of the mechanism is eliminated.

Another object is the provision of an improved pole piece structure for magnetic devices, by means of which a more uniform and accurate air gap may be attained and the pole pieces constructed and assembled with a minimum amount of machining or other labor.

Another object is the provision of an improved mode of securing pole pieces or other magnetic parts to a magnetic field structure, by means of which the pole pieces or other parts can be secured most economically and accurately, and so that these parts cannot be removed or otherwise disturbed in their relation except by the use of special tools.

Another object is the provision of an improved casing structure, which is capable of more economical manufacture and which effects a better insulation and protection of the circuits and mechanism at a lower cost than the devices of the prior art.

Another object is the elimination of expensive machining operations so far as practicable from the manufacture of an electrical measuring instrument of the class described, by the provision of a more simple structure and improved modes of assembly and organization of the elements of the instrument.

Another object is the provision of an instrument of the class described, which can be completely assembled before the adjustment or calibration of the series or shunt resistance is accomplished, so as to assure a more accurate adjustment and to assure the maintenance of the calibration secured.

Another object is the provision of an improved instrument structure and assembly, most of the parts of which lend themselves readily to manufacture by stamping or molding operations and to assembly with a minimum of machining or threading operations.

Another object is the provision of an improved electrical measuring instrument which is readily adaptable for constructing the various types of instruments, such as ammeters, voltmeters, etc.

Another object is the provision of an improved stop structure for the pointer and an improved and simplified cover arrangement for the casing.

Other objects and advantages of the invention will be apparent from the following description and from the accompanying drawings, in which similar characters of reference indicate similar parts throughout the several views.

Referring to the drawings, of which there are three sheets:

Fig. 1 is a full-sized front face view of a small instrument of the flush type, constructed according to the present invention;

Fig. 2 is an enlarged sectional view taken on the plane of the line 2—2 of Fig. 1, with parts of the mechanism shown in elevation;

Fig. 3 is an enlarged elevational view of the mechanism, taken from the bottom of Fig. 1, looking upward, with the casing shown in partial section;

Fig. 4 is an enlarged plan view of the instrument with the cover plate and dial removed;

Fig. 5 is a sectional view taken on the plane of the line 5—5 of Fig. 4, with part of the mechanism shown in elevation;

Fig. 6 is a view in perspective, of the pole piece unit;

Fig. 7 is a rear view of the casing partially broken away, and with the opening exposed for manipulation of the series or shunt resistance;

Fig. 8 is a plan view of the casing with all of the mechanism removed;

Fig. 9 is an elevational view of the "front of board" type of instrument casing; and Fig. 10 is a view in perspective of the shunt employed in using the instrument as an ammeter, with associated connectors.

Referring to Figs. 1 to 5, the mechanism of the present instrument preferably includes a magnetic field structure indicated in its entirety at 20, which consists of a magnet 21 preferably of substantially U-shape, having a pair of legs 22 and 23, and a pole piece unit 24 consisting of a pair of pole pieces 25 and 26 carried by said magnet.

Many of the features of the present invention are applicable to instruments having electromagnets, in which case the magnet 21 may consist of a body of magnetic material provided with appropriate coils, but the present embodiment relates particularly to instruments of the permanent magnet type, and consequently the magnet 21 consists of a permanent magnet.

The pole piece unit 24 is shown in perspective in Fig. 6, and this unit preferably consists of a metal member having a pair of pole pieces 25 and 26 fixedly secured together so as to definitely maintain the relation between these pole pieces, assuring a uniform air gap 27 between the pole pieces and between the pole pieces and the core 28. The pole pieces 25 and 26 are preferably formed out of a block of magnetic material, such as soft iron, which is provided with a centrally located bore 29 having slots 30 at each side, forming the air gaps 27 between the pole pieces 25 and 26.

The walls of the bore 29 form the faces of the pole pieces and the opposite ends 31, 32 of the pole piece unit are preferably provided with a ground flat surface, or a surface substantially complementary to the inner surfaces 33, 34 of the legs 22, 23 of permanent magnet 21.

Some of the advantages of the invention may be realized by fastening pole pieces 25 and 26 together by plates, bridges or other members of non-magnetic metal, permanently securing the pole pieces together before they are assembled with the permanent magnet 21 and secured to the permanent magnet as described herein, but the pole piece unit 24 is preferably provided with one or more integral parts 35, 36 of the same metal connecting the pole pieces 25 and 26 and holding the parts in fixed relation to each other.

The distance between the opposed surfaces 33 and 34 on legs 22 and 23 of permanent magnet 21 is slightly less than the distance between the ends 31, 32 of the pole piece unit 24 so that when the parts are assembled as shown in Fig. 3, the legs 22, 23 resiliently clamp and frictionally engage the ends 31, 32 of pole piece unit and secure the pole pieces to the body of the magnet without the use of any screws, bolts or other securing devices which involve further machine operations, such as drilling, tapping, etc.

The assembly is accomplished by spreading the legs of the permanent magnet with a special tool, locating the pole piece unit between the legs and permitting the legs of the permanent magnet to clamp the pole piece in place.

One of the principal advantages of the foregoing structure is the elimination of the necessity for softening or annealing the permanent magnet for the purpose of drilling the holes for the bolts which usually secure the pole pieces to the magnet in the devices of the prior art. This also permits the manufacture of the magnet by forging and improves the quality of the magnet because it is not necessary to heat treat the magnet to soften it for mechanical work. Furthermore, the magnet is much less expensive because it may be simply forged or bent while hot, hardened, and the ends ground to provide a gap between the legs which is slightly less than the length of the pole piece unit.

The pole pieces 25 and 26 being joined by an integral piece of the same metal, the opposed surfaces of the pole pieces may be accurately ground and the predetermined spaced relation between the curved walls of the bore 29 on each pole piece 25, 26 with respect to the other pole piece, is maintained with a higher degree of accuracy than could be attained by any mechanical assembly of separate pole pieces.

While the provision of a juncture of magnetic metal between the two pole pieces is a radical departure from the prior practice, it is found that when this small portion of the iron is made sufficiently small to completely saturate, the actual loss in magnet efficiency is very low, and the pole pieces may be constructed as a unit and manufactured much more cheaply than similar structures in the devices of the prior art.

The pole piece unit 24 is preferably formed with a pair of transversely extending bores 37, 38 for the purpose of receiving the reduced ends 39 of a pair of spacing members or bridge posts 40. The bridge posts 40 may be secured in bores 38 by a drive fit, thereby eliminating the necessity for threading these bridge posts, the final position of the bridge posts in the bores 37, 38 being determined by the shoulder 41 located between the body of bridge posts 40 and the reduced cylindrical portions 39. The outer end of each bridge post 40 is also preferably provided with a reduced portion 42 adapted to be received in a bore or aperture 43 formed in a sheet metal bridge 44, and the bridge 44 may be secured in place by spinning over the ends of the reduced portions 42 of the bridge posts 40, or by riveting or similar operations, as at 45.

The bridge 44 is thus permanently assembled with the pole piece unit 24, in such manner as to brace the pole pieces 25 and 26, and reinforce the integral portion 35 of the pole piece unit 24.

Centrally located between the pole pieces 25 and 26 is a core of magnetic material 28, preferably provided with a substantially cylindrical outer surface 46 and located in such manner that there is a substantially uniform air gap 47 between the core 28 and all parts of the pole pieces 25, 26. The core 28 is preferably supported by means of a pair of metal plates 48, 49, fixedly secured to core 28 and adapted to engage a supporting plate 60 and the pole piece unit 24, respectively, to hold the core 28 in fixed position.

In order to secure the plates 48 and 49 to core 28, the core is preferably provided with reduced end portions 50 adapted to be received in apertures 51 in plates 48 and 49, respectively, and the end portions 50 may be riveted over outside plates 48, 49, thereby confining the plates 48, 49 against the shoulders 52 on core 28, or the plates 48, 49 may be a pressed frictional fit about the reduced end portions or hubs 50.

The plate 49 may be supported by the pole piece unit 24, by providing the plate 49 with a pair of outwardly projecting arms 53, adapted to extend into the slots 30 formed in the sides of the pole piece unit 24. The width of the arms 53 is such that the plate 49 fits closely between the walls of slot 30, in order to definitely and accurately determine the position of core 28 and establish an air gap 47 of predetermined value. In the case of the relatively cheap instruments constructed according to the present invention, the accuracy of air gap which is attainable by the use of plates 48 and 49 made by stamping operations is found to be sufficient, but in the case of instruments of particularly high grade and standards of accuracy, the arms 53 may be accurately sized after being secured to the core 28, with respect to the slots 3 of the particular pole piece unit 24 so as to attain a high degree of accuracy in the width of the air gap.

Each of the arms 53 of plate 49 is also preferably provided with a head 54, comprising one or more transversely extending portions 55, the inner edges 56 of which are adapted to engage the outside surfaces of the pole piece unit 24 adjacent the slots 30.

The edges 56 of the heads 54 constitute shoulders on the arms 53 for definitely determining the location of this end of the core 28 in a plane parallel to the legs 22, 23 of the magnetic field structure. The sides of the arm 53 engaging the walls of slot 27, determine the location of this end of core 28 with respect to planes transverse to the legs of the permanent magnet.

The other supporting plate 48 for core 28 is also preferably provided with outwardly extending arms 57, of a width adapted to be received in the slots 30 and both the arms 57 are provided with upwardly turned ends 58 adapted to extend into sockets 59 in the supporting plate 60, which is fixedly supported with respect to the pole piece 24 and permanent magnet 21. The sockets 59 comprise apertures complementary in form to the turned up ends or ears 58 carried by arms 57, and in the cheaper form of instruments, sockets 59 merely comprise punched apertures in the supporting plate 60.

It will be evident, however, that a high degree of accuracy may also be obtained by accurately sizing and locating the ears 58 with respect to apertures 59, to increase the accuracy of width of the air gap 47, but it has been found that a highly satisfactory instrument may be constructed by forming plates 48, 49 and 60 by ordinary stamping operations.

The mechanism of the present measuring instrument is preferably so organized that it may all be supported within casing 61 by a single supporting plate 60, and one of the important features of the present invention is the elimination of other superfluous supporting elements or parts which increase the cost of the finished instrument, and which are not necessary in the present simplified arrangement.

The supporting plate 60 is preferably formed by stamping or similar economical operations and this plate preferably consists of a body portion 62 which is adapted to be secured to the magnetic field structure 20 or to the pole piece unit 24. The body 62 may be provided with a pair of apertures 63, preferably formed by punching during the stamping operation, and adapted to register with the bores 37, 38 in the pole piece unit 24. The bores 37, 38, preferably extend through the pole piece unit 24 so as to form sockets for receiving bridge posts on the top and bottom of the pole piece unit 24 at the same time. The plate 60 may thus have its body 62 fixedly secured to the magnetic field structure 20 by means of a pair of bridge posts 64 similar in shape to the bridge posts 40, but preferably provided with reduced portions 65 which are threaded to fit complementary threads in the adjacent ends of the bores 37, 38 to facilitate the disconnection of these parts for repair or replacement.

In some embodiments of the invention, the bridge posts 64 may also have a drive fit in the upper ends of bores 37, 38 as described with respect to bridge posts 40, thereby permanently securing these parts together.

In either case, the body 62 of supporting plate 60 is fixedly secured to the magnetic field structure 20 or to pole piece unit 24 by being confined between the surface of the pole piece unit and the shoulders 66 on bridge posts 64.

The supporting plate 60 is also preferably provided with a pair of laterally extending attaching flanges 67, each flange being provided with an aperture 68 for receiving the screw bolts 69 which secure the mechanism in the casing 61. The attaching flanges 67 are preferably joined to body 62 by offset portions 61' to increase the resilience of attaching flanges 67 and to bring the attaching flanges 67 up into a position immediately below a dial plate 70 so that the dial plate 70 may be secured to the mechanism by the same screws which secure the mechanism in the casing 61, and to provide sufficient space between the plane of the body 62 for receiving the bridge posts 64, balance mechanism, pivots, springs, etc.

The dial plate 70 may consist of a plate of easily worked metal such as brass, of sufficient size to be received in the open end 71 of casing 61 to close the casing and substantially conceal the major part of the mechanism and provide a support for a dial 72. The dial 72 comprises a suitable background of paper or cardboard secured to dial plate 70 by cementing or gluing, and provided with a scale 73 having appropriate division marks and indicia, such as amperes, volts, etc., depending upon the particular type of measurement the instrument is intended to make.

In order to save space and permit access to the mechanism for zero adjustment, the lower end of dial and plate 72, 70, is provided with a slot or aperture 74, the edges of which clear the bridge posts 64 and their associated mechanism. The casing 61 is preferably formed with flat surfaces 114 forming shoulders inside of the open end 71 of the casing 61 for engaging and supporting the dial plate 70.

Metal scales having characters etched thereon may also be used, if desired.

It will thus be observed that the mechanism of the instrument which is carried by supporting plate 60, and the dial 72, may all be secured together and secured in the casing 61 by one or more screw bolts 69, and the screw bolts 69 are preferably threaded into the bores 75 which are formed in casing 61 during the molding operation. The entire mechanism and dial may thus be associated with the casing with a minimum of machine operations, such as the threading of bores, since the apertures in the supporting plate and dial plate may be formed by such economical operations as punching, and it is only necessary to thread two bores in the insulation. In some cases, the screws may cut their own threads in the insulation.

The elimination of expensive machine operations in the manufacture of electrical instruments, particularly the smaller instruments, is of the utmost importance, facilitating the manufacture of high grade instruments at a cost which is within the reach of a vast number of purchasers.

The mechanism of the present instrument is preferably supported and enclosed in a casing 61 of molded insulating material, such as a phenolic condensation product, and the casing may be molded by subjecting the molding powder to heat and pressure, as will be understood by those skilled in the art of molding such products.

The molded casing 61 provides a better protection and insulation of all of the parts, since metal parts may be secured or engaged with any part of the casing without danger of short circuit, or without the necessity for special insulation. Such a molded casing may also be adapted to perform a wide variety of other functions with respect to the support, enclosure and reinforcement of various parts of the mechanism, since the interior of the casing may be made of any desirable shape for cooperation with the parts of the mechanism.

The present casing may be made in a variety of different forms, but is preferably of substantially cylindrical exterior shape in order to save material, and to promote economy in the manufacture of the various dies which are necessary. Two of the standard types of instrument casings are illustrated, such as the "front of board" type in Fig. 9, and the flush type of Figs. 1 to 8.

The flush type casing is preferably provided with a laterally projecting integral annular flange 76, which is adapted to engage the face of a panel or other form of support provided with an aperture for receiving the cylindrical body 77 of casing 61. The attaching flange 76 is preferably provided with a plurality of symmetrically located apertures 78 to be used in securing the instrument to a support and the flange 76 preferably has its forward edge rounded off as at 79 to eliminate marring of the corners and to provide a finished appearance.

The flange 76 may be provided with a relatively flat boss 80 upon its rear face surrounding each of the apertures 78 for engaging a panel or other support, and insuring a flat engagement between the points of support of the flange 76 and the panel.

At its open end 71, the casing 61 is preferably provided with an outwardly projecting annular flange or wall 81 surrounding the dial 72 and extending sufficiently above the dial 72 to support the glass cover plate 82 in spaced relation to the dial 72, pointer 83 and other mechanism.

The cover plate 82 preferably consists of a circular piece or sheet of glass or other stiff, transparent material, adapted to enclose the open end 71 of the casing 61 and prevent entrance of dust or other foreign material, and protect the pointer 83 and other mechanism. The size of cover plate 82 is slightly less than the outer diameter of the annular wall 81 and the cover plate is preferably secured to the casing 61 by means of a bezel 84 of stainless iron or other non-corrodable material.

The bezel 84 preferably comprises a seamless, stamped sheet metal member having a substantially cylindrical wall 85 which is adapted to have a close frictional fit with the outer surface of annular wall 81. The bezel 84 is also provided with an inwardly curved annular formation or flange 86, terminating at an inner edge 87 which is adapted to engage the cover plate 82.

In the flush type instrument of Fig. 2, the edge 88 of the cylindrical part of bezel 84 preferably engages insulating flange 76 when the edge 87 of the curved part 86 clamps glass cover plate 82 on the casing 61, as this particular construction provides a more finished appearance and prevents the insertion of ordinary tools by the uninitiated, beneath the edge 88, to tamper with the instrument, but the bezel 84 and glass plate 82 may be readily removed by inserting the edge of a knife between edge 88 and insulating flange 76 and prying the bezel 84 off uniformly at a number of symmetrically located points about its circumference.

In the "front of board" type of instrument, the molded casing 61, which is illustrated in Fig. 9, the glass and bezel are applied to the end wall 81 of the casing 61, and the casing is ordinarily provided with the annular enlargement 89 at its rear end for forming a finished joint between the panel or other support and the rear side 90 of the casing. In this embodiment, the casing is supported by the connector screw bolts 91, 92 which project from the rear side 90 of the casing.

The interior of casing 61 is preferably provided with a substantially cylindrical surface 93 above the dial 72, but the other parts of the interior of the casing are preferably formed in such manner as to cooperate with the parts of the mechanism in the support and protection of the mechanism, as described hereinafter.

The magnetic field structure 20 forms the heaviest part of the mechanism and consequently the interior of the casing is preferably provided with one or more flat surfaces 94, 95, 96, 97 for engaging and supporting the magnetic field structure 20. Since the magnetic structure is of substantially U-shape, the supporting surfaces 94—97 are arranged in substantially the same way to provide a firm support for all parts of the field structure, and in order to increase the strength of the molded casing, only such recesses are formed in the casing as are necessary to provide space for the parts, for access to parts or to perform other functions.

Thus, the casing is preferably provided with a bore 98 formed by molding the bore in the rear wall 90 for access to a calibration resistance 99 and the bore 98 is preferably provided with a relatively short counter-bore 100, forming an annular shoulder 101 for definitely determining the position of a molded disc 102 which may have a press fit in the bore 100 for closing the bore 98. At one side, the counter-bore 100 is preferably provided with a beveled slot 103 for insertion of a special tool to facilitate the removal of the insulating disc 102. The casing may thus be provided with an opening and a closure in its rear wall for access to certain parts, without the necessity for any special machine operations in the manufacture of any of these parts.

The casing is also preferably provided with two or more molded apertures 104, 105, 106 for receiving the connection screw bolts 91, 92 and other connection bolts, if desired.

The interior of the casing is preferably provided with a groove 107 extending from the aperture 104 to the aperture 106 in the bottom wall 90 of the casing, and the groove 107 is preferably of substantially U-shape in plan, in order to locate the connection bolts 91, 92 symmetrically, and to provide sufficient space for a shunt 108 which is utilized when the instrument is an ammeter.

The shunt 108 comprises a flat strip of a high resistance material having a low temperature co-officient and thermoelectric force against copper, such as manganin. The strip is of substantially uniform width and thickness, and provided with a pair of punched apertures 109, 110 for receiving screw bolts 91, 92. The shunt 108 may be formed by a single punching operation after the suitable dimensions have been predetermined, and the walls of the groove 107 provide barriers for protecting the shunt 108 from short circuit to other parts of the mechanism.

The assembly of this part of the instrument is also greatly facilitated by the provision of the groove which is complementary to the shunt, since the holes 109, 110 of the shunt are placed in registry with the holes 104, 106 in the casing, for reception of the screw bolts 91, 92 by merely locating the shunt in its socket.

The aperture 105 may be provided when it is desired to provide the instrument with an additional connection, such as a second voltage connection, by means of another bolt similar to bolt 91 located in aperture 105 with a terminal for making connection. A voltmeter may thus be provided, having two ranges, but unless the instrument is to have a plurality of connections, the rear wall 90 of the casing is preferably left closed at the aperture 105 by a relatively thin wall 111 which may be punched out whenever it is desired to utilize such a structure.

The screw bolts 91 preferably have one side of their heads 112 flattened as at 113 to prevent their turning when in position. This flattened side is readily obtained by milling or punching and allows a commercial screw to be cheaply modified for use as a non-turning stud. The casing wall is preferably provided with a relatively flat surface 114 adjacent its upper end for engagement with the dial plate 70, the wall of the casing at this point being preferably thickened so that the inner surface 115 of the wall conforms to and registers with the sides of groove 107 for shunt 108.

The interior wall of the casing from the point 116 around the point 117 is preferably made to conform in plan to the outline of groove 107, so that the screw bolts 91, 92, shunt 108 and connected parts may be inserted as a unit after these parts have been assembled together. The wall of the casing is also provided with a vertically extending groove 118 located in the surface 115 in registry with the bore 105 in such manner that an auxiliary screw bolt may be inserted in the bore 105 if desired, without the head interfering with parts of the casing as constructed, for making a number of standard forms of instrument.

Each screw bolt 91 is preferably provided with a connector 119 consisting of a narrow strip of brass terminating in a flat body 120 which is formed with an aperture 121 for receiving a screw bolt 91, 92. The screw bolts are placed in the hole 109 of shunt 108 when a shunt is employed, and the upper surface of the shunt is brazed or otherwise permanently secured to the lower surface of the head 112, after which the boly 120 of the connector 119 is likewise brazed to the lower surface of the shunt, and each end of the shunt is thus provided with an appropriate screw bolt and a connector 119.

It will thus be observed that the shunt 108 is secured to its connectors and screw bolts in a permanent manner so that the contact resistance of these parts will not vary and a high degree of accuracy can be attained by the use of the present construction.

When the instrument is used as a voltmeter, the shunt 108 is omitted and the connectors 119 may be secured on bolts 91, 92 by merely clamping the bolts in the casing by means of a plurality of nuts 122. The rear wall 90 of the casing is preferably formed with a socket 123 about the nuts 122 to permit the insertion of a small socket wrench for tightening the nuts 122 and to locate one of the nuts 122 below the surface of the rear wall 90, so that the nuts will not interfere with the flat engagement of the rear wall of the casing with a panel or other support.

The molded casing 61 is also provided with a pair of grooves 124 leading from the shunt groove 107 adjacent bolt apertures 104, 106 to the bore 98, and providing recesses for receiving the conductors 119. The casing is also provided with a slot 125 and recess 126 centrally located in the interior of the bottom wall and communicating laterally with the bore 98 to provide additional space for the lower bridge 44 and its associated parts, and to permit passage of another conductor 127 leading from the moving coil element to the calibration resistance 99.

The recess 126 is formed with a smaller centrally located recess 128 providing space for the bearing mechanism carried by bridge 44.

The casing is also provided with relatively thick walls at the points 129, 130, the walls extending over to the inner flat surfaces 131 which are adapted to engage the sides of the magnetic field structure 20 and locate the magnet and other mechanism in the assembly of the mechanism with the casing.

The casing is also formed with relatively flat shoulders or surfaces 132, these surfaces being slightly below the plane of the surface 114, which supports the dial plate at the upper part of the casing in Fig. 8, since the supporting plate 60 is interposed between the dial plate 70 and the surfaces 132. The parts 132 of casing are formed with the bores 75 into which the screw bolts 69 are threaded to secure the mechanism in the casing, and also to secure the dial to the mechanism.

In order to provide a more firm support for the mechanism in the casing, and to prevent the possibility of rattling of the heaviest parts of the mechanism, the magnetic field structure 20 is preferably clamped against the flat surfaces 94—97 by the attaching flanges 67 on the supporting plate 60, the flanges 67 being bent into engagement with the surfaces 132 by screw bolts 69.

The supporting plate 60 may be formed with a transversely extending stiffening rib 145, and is also preferably provided with a laterally projecting arm 133 formed with a round body 134 providing a support for a calibration resistance spool 135. The resistance spool 135 is preferably of the type described in my prior Patent No. 1,704,151, issued March 5, 1929, spools for electrical instruments and the like, and the spool may be secured to plate body 134 by a screw bolt 136 passing through the molded insulating spool 135 and threaded into a bore 137 in body 134.

The body 134 is preferably provided with a stamped tubular formation 138 about the bore or pressed aperture 137 to provide increased surface for the formation of screw threads. The spool 135 is provided with resistance windings 99, the ends 139, 140 of which pass upward through the rear wall of the spool, and are soldered or otherwise secured to connectors 141 carried by the integral insulating lugs 142, as shown in said patent. This end of the spool being disposed adjacent the bore 98 in the rear wall of the casing, it will be evident that connections may be made to the connectors 143, 144 after all of the other parts of the instrument have been assembled, and after the exact value of the calibration resistance has been determined.

The screw bolt 136 is also accessible through the bore 98 so that the spool 135 may be inserted after the rest of the instrument has been assembled and it will thus be observed that the complete instrument may be assembled and adjusted before the value of the calibration resistance 99 is determined, after which the instrument may be calibrated and the resistance 99 inserted and secured to supporting plate 60 by screw 136 and the appropriate connections made to connectors 143, 144.

The structure described therefore has substantial advantages in the attainment of a high degree of accuracy, since the adjustment of the instrument may readily be maintained after all of the parts have been assembled, and the calibration secured at this time is more likely to be maintained than would be the case if the instrument were calibrated and then located in the casing.

The securement of the instrument in the casing, and the tightening or adjustment of various screws and other parts, or the handling of the mechanism during the assembly, is likely to destroy the effect of any calibration which is made before the instrument is assembled with its supporting casing.

The provision of a structure permitting access to the calibration resistance after the entire instrument has been assembled and otherwise adjusted, thereby assures the provision and maintenance of a high degree of accuracy.

Both of the bridges 44 and 146 preferably consist of short strips of sheet metal, such as brass, formed with a centrally located body 147 which may be circular and provided with apertures 43 at each end for receiving the reduced parts of the bridge posts 40 and 64. The body 47 of each bridge is preferably formed with a downwardly extending pressed tubular formation 148 surrounding a centrally located aperture 149, and providing a greater surface for the formation of threads in the aperture or bore 149 for reception of the bearing screw 150.

The upper bridge posts 64 also preferably support a stop plate 187 which comprises a thin sheet metal member preferably formed with a centrally located aperture 188 for embracing the tubular formation 148 and with an aperture 189 at each end for receiving the reduced portion 190 of the bridge posts 64. The stop plate 187 and bridge 146 may be assembled together with the tubular portion 148 in aperture 188 and placed upon the reduced portions 190 of the bridge post 64 and secured in place by nuts 191 or by spinning over the ends of the bridge posts if it is desired to make a permanent assembly.

In general, it will be desirable to spin over the ends of the bridge posts only at one side of the instrument, using threaded bridge posts and nuts at the other end to facilitate disconnection of these parts for repair or replacement.

The stop plate 187 is formed with a pair of sheet metal arms 192, 193 which extend substantially radially with respect to the pivots 152 of the moving element, and the stop arms 192, 193 are preferably so located as to stop the pointer slightly beyond either end of the scale 73. In order to increase the resiliency of the arms 192, 193, these sheet metal members are twisted through an angle of 90° adjacent the body of the stop plate 187 so as to present a flat surface for engagement with needle 83 rather than the edge of the plate. The stop arms having their thinnest dimension in the direction of movement of the needle, they are adapted to give slightly to absorb the shock when the needle is caused to strike the arms by an overload on the instrument.

The needle 83 preferably consists of a relatively light sheet metal member formed with a head 194 and a point 195 adjacent the scale 73. The needle 83 is also preferably formed with one or more offsets 195' adapted to extend downward in the slot 74 so that the needle may be attached to hub 157 below the plane of dial 72. The offset 195' cooperates with the resilient stop members 192, 193 to definitely limit the movement of the needle and prevent the bending of the needle by striking the side wall 93 of the casing.

The stop plate 187 may also be provided with an integral laterally and inwardly projecting strip 196 adapted to extend from the bridge 147 over the mechanism for connection to the connector bolt 91. As the connector bolt 91 is provided with a sheet metal strip 119, this strip may be bent upward in spaced relation to the body of the permanent magnet 21 and the strip 196 may be connected to strip 119 by a drop of solder at the point 197.

The bearing screws 150 are each provided with a jewel 151 or other form of hard bearing for receiving the pivot point 152 carried by the movable element 153.

The moving element 153 may be of the type disclosed in the patent of John H. Miller, Patent No. 1,824,561, issued September 22, 1931, and the present instrument is also preferably provided with a balance mechanism of the type disclosed in said prior application.

The moving element 153 thus includes a seamless sheet metal frame 154 of relatively light metal, such as aluminum, having laterally projecting flanges 155 and provided with a plurality of windings 156 of fine insulated wire, such as enameled wire. Each end of the moving element 153 is provided with a hub 157 which may be centrally located on the moving element 153 at each end by cementing the plate 158 on top the wires 156. The upper hub 157 is preferably formed with an annular shoulder 159 against which are secured a plurality of sheet metal plates 160 having resilient arms 161 which may project radially from the plates 160 to form a balance mechanism.

Each of the arms 161 is preferably located adjacent another arm on a different plate, and the adjacent arms 161 are spread to resiliently engage the interior of a tubular weight 162 is releasably secured in adjusted position by the resilient arms 161. A pointer 163 may be located between the plates 160 to space the arms 161 from each other and the pointer 163 and plates 160 may all be secured on hub 157 by forming riveting formations 164 which confine the plates against annular shoulder 159. All of the details of the balance mechanism may be exactly as described in said prior application, which is directed particularly to the balance mechanism.

The moving element 153 is preferably provided with a spiral spring 165, 166 at each end for connecting the windings 156 electrically with other parts of the instrument, and for urging the pointer to zero position and resisting the torque produced by currents passing through the coils 156. The hub 157 preferably supports a light sheet metal plate 167 secured thereto by rivet formations 168, and the plate 167 is provided with an upwardly turned flange 169 which is secured to the inner end of spiral spring 165 by a drop of solder, or other convenient securing means. One end of the windings 156 is connected to plate 167 and hence to the spring 165.

The lower bearing screw 150 is preferably provided with a pair of insulating washers 170, 171 for insulating another connector plate 172 which is provided with an enlarged aperture 173 to prevent contact between connector plate 172 and bearing screw 150. The bearing screw being located in the bridge 44, the connector plate 172 may be secured to the frame and insulated from the frame by placing washer 170 on screw 150, locating bearing plate 173 about screw 150 and clamping insulating washer 171 and the other parts together by a lock nut 174. The nut 174 not only secures the connector plate 173 in fixed position, but maintains the adjustment of the bearing screw 150.

The connector plate 172 is provided with an upwardly extending strip 175 which may be secured to the outer end of spiral spring 165 by a drop of solder or other convenient securing means. The connector plate 172 also carries another strip of metal 127 extending in an opposite direction from the strip 172 toward the calibration resistance spool 135 and the conductor 127 may be connected to one end 139 of the calibration resistance 99 by a drop of solder placed on connector 144 and conductor 127.

The other end of calibration resistance 99 is connected with one of the connection bolts 91 by a conductor 176, comprising a strip of sheet metal carried by a metal plate 177 having an aperture receiving the screw bolt 91. The plate 177 and connector strip 176 may be brazed or otherwise secured to head 112 of screw bolt 91, exactly as described with respect to connector plate 120 and strip 119 shown in Fig. 4.

It will thus be observed that one end of the moving element and its electrical connections are suitably insulated from the bridge 44 and all other metallic parts of the field structure 20. The hub 157 is insulated from the frame since the pivot point 152 engages a jewel having insulating properties and the supporting plate 172 for the outer end of spiral spring 165 is insulated from the bridge 44 by washers 170, 171.

The hub 157 may be secured to the opposite end of moving element 153 in a similar manner, its supporting plate 158 being insulated from the coils 156 by the insulation on wires 156 and the cement which secures plate 158 on moving element 153.

One of the plates 160 on the balance mechanism is preferably provided with an auxiliary arm 178 bent upward from plate 160 and adapted to provide a support for the inner end of spiral spring 166, to which it is secured by a drop of solder or other convenient securing means. The other end of the moving coils or windings 156 is connected to the balance mechanism and arm 178, so that the spiral spring 166 forms one of the leads from the coils of the moving element. The other end of spiral spring 166 is preferably fixedly secured to a downwardly projecting flange 179 by a drop of solder or other securing means, flange 179 being carried by a zero adjustment plate 180 which is secured in place by a lock nut 181 on upper bearing screw 150.

The zero adjustment plate 180 is preferably provided with a pair of rearwardly projecting arms 182, 183 formed with a slot 184 between them for receiving the eccentric pin 185 of a zero adjustment screw 186. The ends of the arms 182, 183 are preferably inclined outward from each other in order to facilitate the engagement of pin 185 in slot 184, in the assembly and adjustment of the instrument.

In order to improve the electrical connection from the zero adjustment plate to the conductor 196, the zero adjustment plate may be provided with an upwardly projecting ear 198 which is connected by some simple fastening means, such as a drop of solder, to a spring lead 199 which has its other end provided with a body 200, having an aperture for receiving the reduced end 190 of the bridge post 64. The zero adjustment plate is thus directly connected to conductor 196 through the bridge post, but in some embodiments of the invention, the connection may be made through the bridge.

The use of the auxiliary spring lead 199 makes all of the connections from the binding post 91 to the moving coils 156, relatively permanent and immovable connections, the contact resistance of which does not vary nor change the electrical calibration of the instrument in different positions of the zero adjustment plate.

The upper bearing screw 150 is preferably provided with a spring washer 201 for causing the zero adjustment plate 180 to frictionally engage bridge 146 to maintain the zero adjustment plate in any predetermined position. The nut 181 is preferably provided with a reduced extension 202 adapted to extend through the apertures in spring washer 201 and zero adjustment plate 180 for engagement with bridge 146, so that the nut 181 may be used as a lock nut to secure upper bearing screw 150 in adjusted position, without preventing movement of the zero adjustment plate 180.

The zero adjustment plate 180 and spring washer 201 are confined between annular shoulder 202 on nut 181 and bridge 146 and the movement of the zero adjustment plate does not affect the adjustment of the bearing screw 150.

The zero adjustment screw 186 comprises a minute bolt having a head 204 provided with a kerf 205 or other tool engaging formation for effecting rotation of the bolt 186. The bolt 186 is rotatably supported in an aperture 206 on glass cover plate 82 by a washer plate 207 fixedly secured to the bolt 186 by riveting or other operations. A spring washer 208 is interposed between the lower surface of the glass and washer plate 207, regulating the amount of friction and holding the zero adjustment screw in any adjusted position. The pin 185 is inserted into a small aperture eccentrically located in washer plate 207, where it may be secured by a drop of solder 209.

In the case of a voltmeter, the circuit of the instrument may be traced from the binding post 91 to the binding post 92, as follows.

The binding post 91, conductor 119, conductor 196, conductor 199, zero adjustment plate 180, torsion spring 166, balance mechanism plate 178, coils 156, torsion spring plate 169, torsion spring 165, conductor 195, conductor 127, conductor 144, calibration resistance 99, connector 143, conductor 176, binding post 92.

In the case of an ammeter, the circuit is substantially the same, except that the shunt 108 is provided between binding posts 91, 92 and the calibration resistance 99 is of an appropriate value, as will be understood by those skilled in the art.

The present instrument does not differ in its fundamental principle of operation from the devices of the prior art, but the construction, organization and relation of the parts has been made such that the cost of the instrument is greatly reduced, and a great many of the parts which necessitated special machine work in the devices of the prior art, lend themselves readily to manufacture by stamping operations in the present instruments. The bridges 147 and 144, the stop plate 187, the supporting plate 60, the dial plate 70, the connector plates 200, 196, 119 and the balance mechanism may all be manufactured by stamping these parts out of sheet metal of appropriate thickness, and it will be noted that wherever possible or desirable, the use of threaded connections has been eliminated and the structure rearranged so that the parts might be assembled and secured by spinning and clamping devices.

The present instrument is adaptable to the manufacture of many different types of instruments, such as ammeters, voltmeters, etc., by the use of appropriate shunts and connections, and the present instruments may be so cheaply constructed that they come within the means of a vast number of purchasers, making it practical to employ a number of different instruments, each of which has a range peculiarly adapted for its peculiar work, thereby rendering the attainment of more accurate results at no greater cost.

The parts of the present instrument are insulated in a better manner than the devices of the prior art, and there is less danger to the users of the instrument through short circuiting of electrical connections, or through grounding of any of the conductors on the casing as might occur with the metallic casing of the prior art. The present casing is also so arranged, and the mechanism so organized that the complete instrument may be assembled in its casing before the calibration resistance is adjusted or calibrated, thereby facilitating the obtainment of a higher degree of accuracy than could otherwise be secured.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In an electrical measuring instrument the combination of a magnetic structure comprising a permanent magnet, and a pole piece unit comprising a member formed with opposed pole pieces and integrally joined with each other, said magnet having a pair of legs resiliently engaging and securing said pole piece unit to said magnet, a pair of spacers having a drive fit in the body of said magnetic structure, and a bridge permanently secured to the ends of said spacers.

2. In an electrical measuring instrument the combination of a magnetic structure comprising a permanent magnet, and a pole piece unit comprising a member formed with opposed pole pieces and integrally joined with each other, said magnet having a pair of legs resiliently engaging and securing said pole piece unit to said magnet, a pair of spacers having a drive fit in the body of said magnetic structure, a bridge permanently secured to the ends of said spacers, said body having a pair of threaded bores, a pair of spacers secured in said bores, and a second bridge carried by said latter pair of spacers.

3. In an electrical measuring instrument the combination of a magnetic structure comprising a permanent magnet, and a pole piece unit comprising a member formed with opposed pole pieces and integrally joined with each other, said magnet having a pair of legs resiliently engaging and securing said pole piece unit to said magnet, a pair of spacers having a drive fit in the body of said magnetic structure, a bridge permanently secured to the ends of said spacers, said body having a pair of threaded bores, a pair of spacers secured in said bores, a second bridge carried by said latter pair of spacers, a supporting plate carried by said latter spacers, a molded insulating casing for said instrument and a pair of threaded members passing through said plate and threaded into said insulating casing to secure said instrument in said casing.

4. In an electrical instrument the combination of a molded insulating casing having a socket adapted to locate the body of an instrument mechanism, with a mechanism, having a supporting plate provided with apertures, said casing having apertures registering substantially with the apertures of said plate when said mechanism is located in said casing, a threaded member passing through said plate and threaded into the aperture in said casing, a calibration resistance spool carried by said plate, said casing having an aperture for placing said spool, and securing means for said spool adapted to be operated through said aperture.

5. In an electrical instrument the combination of a molded insulating casing having a socket adapted to locate the body of an instrument mechanism, with a mechanism, having a supporting plate provided with apertures, said casing having apertures registering substantially with the apertures of said plate when said mechanism is located in said casing, a threaded member passing through said plate and threaded into the aperture in said casing and a dial secured to said casing by said threaded member and covering said plate and mechanism.

6. In an electrical measuring instrument the combination of an integral pole piece unit having a pair of pole pieces joined by an integral part and separated at other points by an air gap, with a core of substantially similar shape as the opposed surfaces of said pole pieces, a plate supporting one end of said core and having headed formations slidably supported in said air gap between said pole pieces, a supporting plate secured to said pole pieces, and another core plate having parts engaged in apertures in said supporting plate to secure said core with respect to said pole pieces.

7. In an electrical measuring instrument the combination of an integral pole piece unit having a pair of pole pieces joined by an integral part and separated at other points by an air gap, with a core of substantially similar shape as the opposed surfaces of said pole pieces, a plate supporting one end of said core and having headed formations slidably supported in said air gap between said pole pieces, a supporting plate secured to said pole pieces, another core plate having parts engaged in apertures in said supporting plate to secure said core with respect to said pole pieces, a pair of spacers securing said supporting plate to said pole pieces, a bridge carried by said spacers, a moving element rotatably mounted on said bridge and a stop plate carried by said spacers and having a pair of resilient arms for limiting movement and absorbing shock of said moving element.

8. A pole piece unit for electric devices having dynamic moving parts, comprising an integral metal member having pole piece formations oppositely located with respect to an air gap, and having an integral portion joining said pole piece formations and supporting said formations in definite spaced relation to each other, and a metal bridge fixedly secured to said pole pieces in spaced relation to said integral metal member, said pole pieces having bores, a pair of spacers having a drive fit in said bores and a bridge having apertures to receive said spacers, the ends of said spacers being spun over to secure said bridge.

In witness whereof, I hereunto subscribe my name this 26 day of May, 1930.

RAY SIMPSON.